(12) United States Patent
Medved et al.

(10) Patent No.: US 7,509,410 B1
(45) Date of Patent: Mar. 24, 2009

(54) BULK STATUS ENQUIRY IN A NETWORK

(75) Inventors: Jan Medved, Pleasanton, CA (US);
Snehal Karia, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 641 days.

(21) Appl. No.: 09/457,507

(22) Filed: Dec. 8, 1999

(51) Int. Cl.
*G06F 15/16* (2006.01)

(52) U.S. Cl. ...................................... 709/224

(58) Field of Classification Search ................. 709/102, 709/203, 205, 224, 236; 370/356, 401, 493, 370/248, 465; 379/85; 455/466, 9
See application file for complete search history.

(56) References Cited

U.S. PATENT DOCUMENTS

| | | | | |
|---|---|---|---|---|
| 5,212,691 | A | * | 5/1993 | Hokari ........................ 370/384 |
| 5,913,164 | A | * | 6/1999 | Pawa et al. ................... 455/427 |
| 5,966,663 | A | * | 10/1999 | Gleason ....................... 455/466 |
| 6,058,163 | A | * | 5/2000 | Pattison et al. ................. 379/85 |
| 6,144,669 | A | * | 11/2000 | Williams et al. ............. 370/401 |
| 6,278,708 | B1 | | 8/2001 | Von Hammerstein et al. |
| 6,292,495 | B1 | * | 9/2001 | Von Hammerstein et al. .......................... 370/465 |
| 6,298,043 | B1 | * | 10/2001 | Mauger et al. ............... 370/248 |
| 6,385,196 | B1 | * | 5/2002 | Hayball et al. .............. 370/356 |
| 6,483,855 | B1 | * | 11/2002 | Minagawa ................... 370/493 |

OTHER PUBLICATIONS

Frame Relay Specification with Extensions, Document No. 001-208966 Rev 1.0 Published by Digital Equipment Corporation, Northern Telecom, Inc., and StrataCom, Inc. (Sep. 18, 1990).

* cited by examiner

*Primary Examiner*—Rachna S Desai
*Assistant Examiner*—Chau Nguyen
(74) *Attorney, Agent, or Firm*—Blakely, Sokoloff, Taylor & Zafman LLP (57) ABSTRACT

A method and apparatus are described for status enquiry between sending and receiving nodes in a network. For the sending node, the method comprises sending a bulk status enquiry message to inquire status of a plurality of calls to the receiving node. The bulk status enquiry message conforms to a bulk status enquiry format. For the receiving node, the method comprises sending a bulk status enquiry response message in response to a bulk status enquiry message inquiring status of a plurality of calls from the sending network node. The bulk status enquiry message conforms to a bulk status enquiry format and the bulk status enquiry response message conforms to a bulk status enquiry response format.

63 Claims, 12 Drawing Sheets

BULK STATUS ENQUIRY IN A NETWORK

FIELD OF THE INVENTION

This invention relates to computer networks. In particular, the invention relates to status enquiry.

THE BACKGROUND OF THE INVENTION

Messages, or calls, transmitted within the network are usually queued or buffered, especially during peak hours waiting to be forwarded or processed. Sometimes these calls may be lost or contaminated due to network failures. It is, therefore, useful for a network management system or administrators to know the status of the calls. Status enquiry procedure, or call auditing, is developed to provide a mechanism to obtain a state of a connection, such as the call state, the type of connection being supported, the end state of a point-to-multipoint connection, or certain error conditions.

For example, the Asynchronous Transfer Mode (ATM) communication model provides a status enquiry procedure in the user-network interface (UNI) protocol. According to this protocol, the status enquiry message is sent by a user or the network at any time to solicit a status message from a peer layer 3 entity. A status message is then sent in response to the status enquiry message by the enquired user or network.

A major drawback of this status enquiry procedure is that the status enquiry is done one call at a time and requires multiple (up to eight) messages to be exchanged per call. For large number of calls, the number of exchanged messages may be very high, resulting in diminished call processing capacity and congested network traffic. In addition, the procedure does not provide a way to tag the enquiry. Therefore, it is not clear for the system administrator if a certain call has been audited. As a result, many calls may have to be audited repeatedly, resulting in wasteful time and congested network traffic. When the number of calls to be audited is large, such as typical in ATM switched virtual channel (SVC) calls, the traditional status enquiry procedure degrades network performance significantly.

SUMMARY OF THE INVENTION

A method and apparatus are described for status enquiry between sending and receiving nodes in a network.

For the sending node, the method comprises sending a bulk status enquiry message to inquire status of a plurality of calls to the receiving node. The bulk status enquiry message conforms to a bulk status enquiry format.

For the receiving node, the method comprises sending a bulk status enquiry response message in response to a bulk status enquiry message inquiring status of a plurality of calls from the sending network node. The bulk status enquiry message conforms to a bulk status enquiry format and the bulk status enquiry response message conforms to a bulk status enquiry response format.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

A method and apparatus are described for status enquiry between network nodes. An enquirer node sends a bulk status enquiry (BSE) message to an enquiree node. The BSE message is related to a plurality of calls in the network nodes. The enquiree node responds with a bulk status enquiry response (BSER) message. In cases of failures due to time-out or invalid messages, a standard status enquiry is used.

The advantages of the BSE procedure compared to the standard or normal status enquiry includes the following:

The number of messages exchanged between the two nodes is drastically reduced. This reduces traffic congestion and conserves valuable resources of the network such as processor and segmentation and re-assembly (SAR) bandwidths.

The re-synchronization of the call state between the two nodes is much faster, resulting in better network performance. In addition, the BSE procedure provides start and end flags. This allows re-synchronization of only those calls that may have been affected by the signaling ATM adaptation layer (Q.SAAL) reset. In addition, the BSE procedure can also be started by a network administrator through a user interface, or can be automatically done using a script running periodically.

The time-out for the expected response is very high, allowing the system to accept messages that are important for network services.

Interoperability with legacy equipment is preserved. For example, an ATM switch having the BSE/BSER handler can still perform the standard status enquiry.

The BSE procedure scales well with increased number of supported calls. The maximum number of calls that can be re-synchronized in one message can be reconfigurable according to the network needs.

Figure 1A:
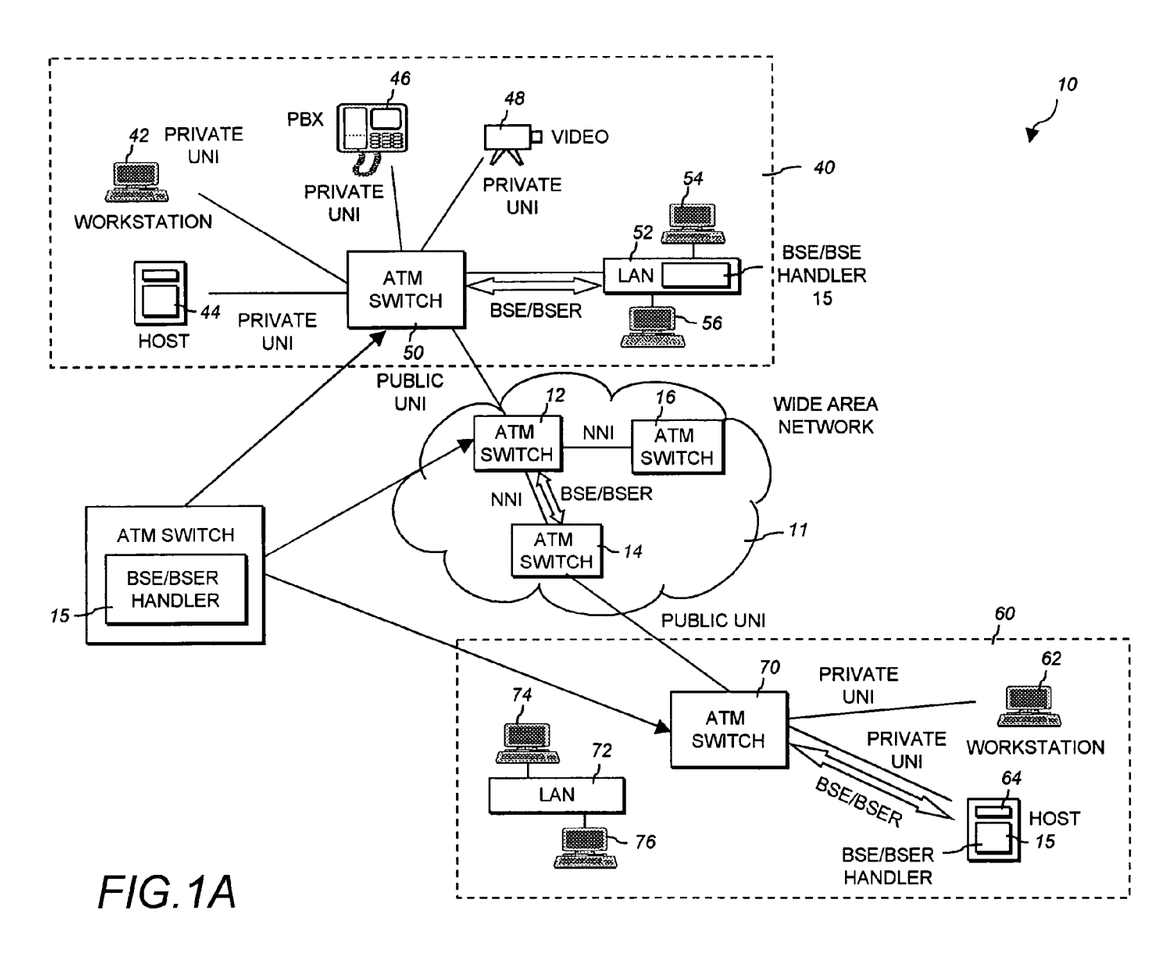
FIG. 1A shows a network system in which one embodiment of the invention can be practiced.

FIG. 1A shows a network system 10 in which one embodiment of the invention can be practiced. The network system 10 includes a wide area network (WAN) 11, subnetworks 40 and 60. In the network system 10, there may be a number of local area networks (LANs), such as those included in the subnetworks 40 and 60. It is contemplated that these LANs supporting the BSE procedure are in a form of emulation of a connection-oriented network, such as Local Area Network Emulation (LANE), Multiprotocol over ATM (MPOA). In addition, the BSE procedure can be used in any network or subnetwork protocols where call auditing is supported.

Subnetworks 40 and 60 are coupled to the WAN 11 via public user network interface (UNI) links to exchange messages via ATM switches or nodes. The WAN 11 includes ATM switches 12, 14, and 16. The ATM switches 12, 14, and 16 are linked by network-network interface (NNI) links. The NNI links may be private NNI (PNNI). In particular, the ATM switch 12 and the ATM switch 14 are linked by an NNI link configured to handle bulk status enquiries via bulk status enquiry (BSE) messages and bulk status enquiry response (BSER) messages.

The subnetwork 40 includes an ATM switch 50, a workstation 42, a host machine 44, a PBX system 46, a video system 48, a local area network (LAN) 52, computers 54 and 56. The computers 54 and 56 are connected to the LAN 52. The workstation 42, the host machine 44, the PBX 46, the video system 48, and the LAN 52 are linked to the ATM switch 50 by private user-network interface (UNI) links. In particular, the ATM switch 50 and the LAN 52 are configured to handle bulk status enquiries via bulk status enquiry (BSE) messages and bulk status enquiry response (BSER) messages.

Similarly, the subnetwork 60 includes an ATM switch 70, a workstation 62, a host machine 64, a local area network (LAN) 72, and computers 74 and 76. The computers 74 and 76 are connected to the LAN 72. The workstation 62, the host machine 64, and the LAN 72 are linked to the ATM switch 70 by private user-network interface (UNI) links. In particular, the ATM switch 70 and the host machine 64 are configured to handle bulk status enquiries via bulk status enquiry (BSE) messages and bulk status enquiry response (BSER) messages.

The topology shown in FIG. 1A is for illustrative purposes only. Other network topologies and/or configurations are possible. Each of the ATM switches 12, 14, 50, and 70 and the LAN 52, and the host machine 64 is configured to have a BSE/BSER handler 15. The BSE/BSER handler 15 provides a bulk status enquiry to be processed. In one embodiment, the BSE/BSER handler 15 is implemented in a computer system.

Figure 1B:
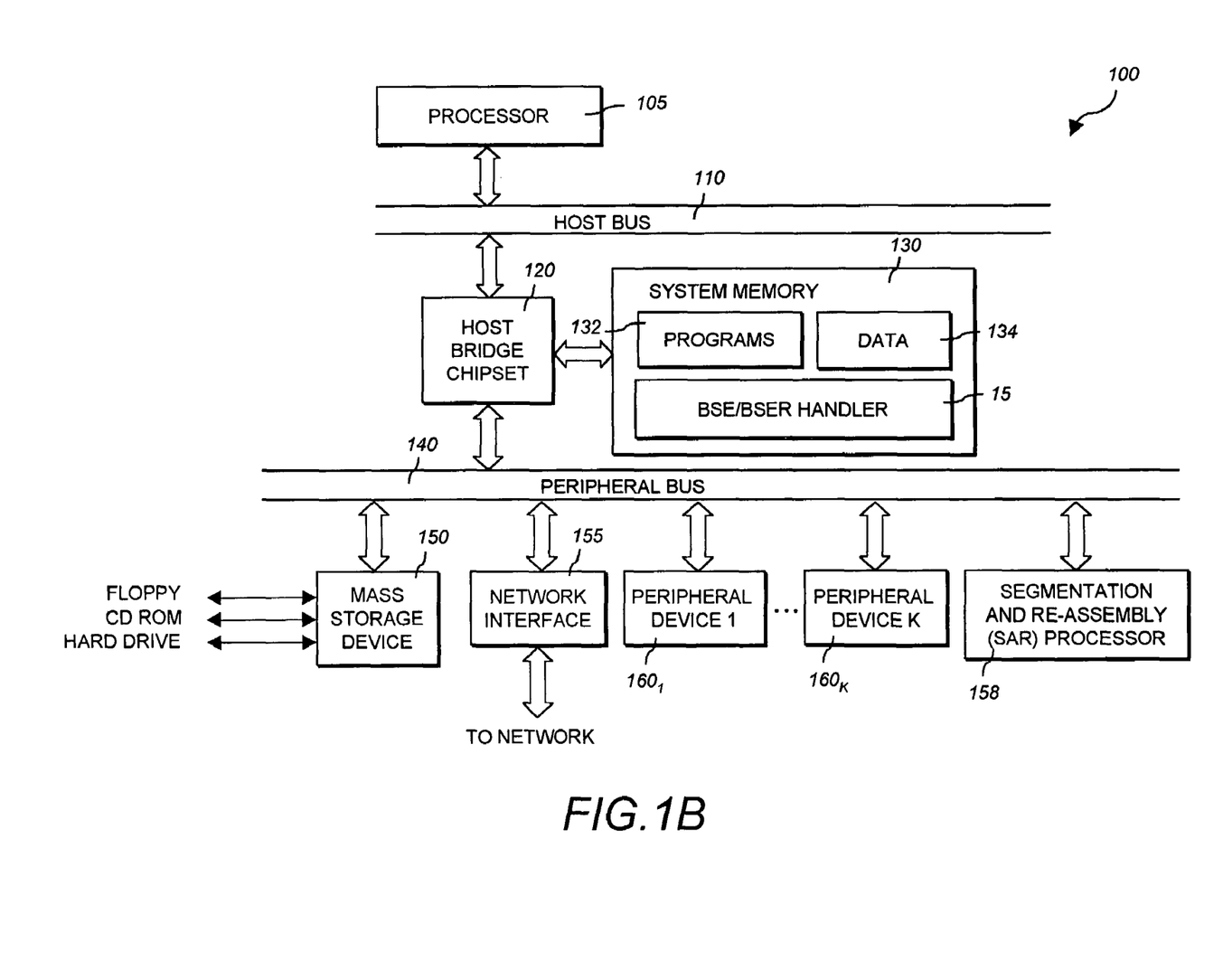
FIG. 1B shows a computer system in which one embodiment of the invention can be practiced.

FIG. 1B shows a computer system 100 in which one embodiment of the invention can be practiced. The computer system 100 may be used as part of an ATM switch, a host machine, a workstation, a LAN, and any other system or subsystem connected to the network. The computer system 100 include a processor 105, a host bus 110, a host bridge chipset 120, a system memory 130, a peripheral bus 140, a mass storage device 150, a network interface device 155, a segmentation and re-assembly (SAR) processor 158, and K peripheral devices $160_1$ to $160_K$.

The processor 105 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 120 includes a number of interface circuits to allow the host processor 105 access to the system memory 130 and the peripheral bus 140. The host bridge chipset 120 may include a memory controller, a bus interface circuit, and an I/O controller. The memory controller provides an interface to the system memory 130. The I/O controller provides control of I/O functions.

The system memory 130 represents one or more mechanisms for storing information. For example, the system memory 130 may include non-volatile or volatile memories. Examples of these memories include flash memory, read only memory (ROM), or random access memory (RAM). The system memory 130 contains a program 132, a data storage 134, and the BSE/BSER handler 15 as shown in FIG. 1A. Of course, the system memory 130 preferably contains additional software (not shown), which is not necessary to understanding the invention.

The peripheral bus 140 provides bus interface to the mass storage device 150, the network interface 155, and the peripheral devices $160_1$ to $160_K$. In one embodiment, the peripheral bus 140 is the peripheral component interconnect (PCI) bus.

The mass storage device 150 includes CD ROM, floppy diskettes, and hard drives. The mass storage device 150 stores non-volatile information such as programs or data. The mass storage device 150 provides a mechanism to read machine-readable media. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The network interface device 155 provides interface to a network such as ATM, LAN, WAN, etc. The SAR processor 158 performs segmentation and re-assembly of ATM cells. The peripheral devices $160_1$ to $160_K$ may include an audio device, a multimedia device, a modem, a printer controller, etc.

A bulk status enquiry process involves an enquirer node and an enquiree node. The enquirer node is a sending node and the enquiree node is a receiving node. The sending node and the receiving node may be any one of an ATM switch, a customer premises equipment (CPE), a LAN, a host machine, a workstation, a PBX system, a video system, or any other systems or subsystems having ability to communicate via the network. The enquirer node starts a timer having a predetermined time-out period when it sends a BSE message to the enquiree node. The time-out period can be changed by the system administrator. In one embodiment, a default value (e.g., 30 seconds) is used. The BSE message conforms to a BSE message format. The BSE message is started once all the calls on that link are tagged for bulk status enquiry. The enquiree node sends a BSER message upon receipt of the BSE message. The BSER message conforms to a BSER format. In one embodiment, the BSE and BSER formats are the same. The BSE and BSER messages correspond to a plurality of calls in the network nodes. The number of calls whose status is to be inquired is provided in the messages.

On any given link, there is only one BSE outstanding at any given time. The next BSE message is sent by the sending node after the BSER message is received. In other words, the protocol is acknowledge-based sending, as opposed to paced sending.

For interoperability, the user can enable or disable the BSE/BSER handler on a per link basis. In one embodiment, default mode can be used according to the type of the link. For example, by default, the BSE/BSER handler may be enabled for interfaces running PNNI, and disabled for interfaces running Interim Inter-Switch Signaling Protocol (IISP) and UNI. In an alternative embodiment, the user may initiate the BSE with the start flag. If there is no response within a given time frame, for a given number of retries, the normal or standard status enquiry is then restarted.

A bulk status enquiry process may result in a success, a re-try, a failure due to time-outs, a failure due to invalid enquiry response messages, and a failure due to invalid enquiry messages. When there is a failure, a standard bulk status enquiry on a per call basis is used.

FIGS. 2A through 2E show the BSE procedure between an enquirer node and an enquiree node. The BSE procedure involves a time sequence of message exchanges between the two nodes over an established communication link. The term "path" is used in the description refers to the link at a particular time instant.

Figure 2A:
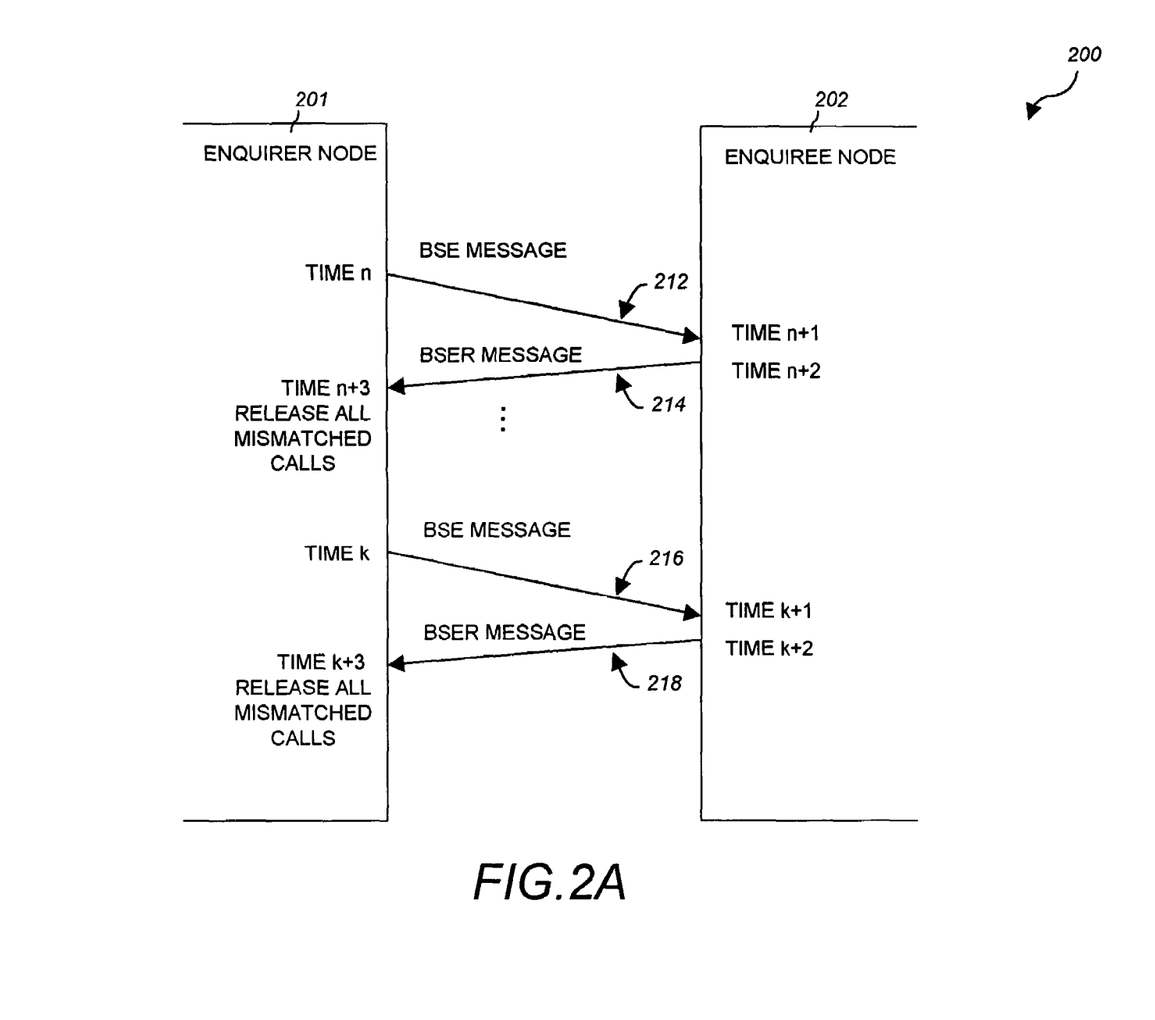
FIG. 2A shows a successful bulk status enquiry.

FIG. 2A shows a successful bulk status enquiry 200. The bulk status enquiry 200 involves an enquirer node 201 and an enquiree node 202.

At time n, the enquirer node 201 sends a BSE message to the enquiree node 202 via a path 212. The enquiree node 201 receives the BSE message at time n+1 and sends a BSER message at time n+2 via a path 214. The enquirer node 201 receives the BSER message at time n+3 within the time-out period as set by the timer of the enquirer node 201. All mismatched calls are then released.

The enquiry process continues for other calls. For example, at time k, the enquirer node 201 sends a BSE message to the enquiree node 202 via a path 216. The enquiree node 201 receives the BSE message at time k+1 and sends a BSER message at time k+2 via a path 218. The enquirer node 201 receives the BSER message at time k+3 within the time-out period as set by the timer of the enquirer node 201. All mismatched calls are then released.

Figure 2B:
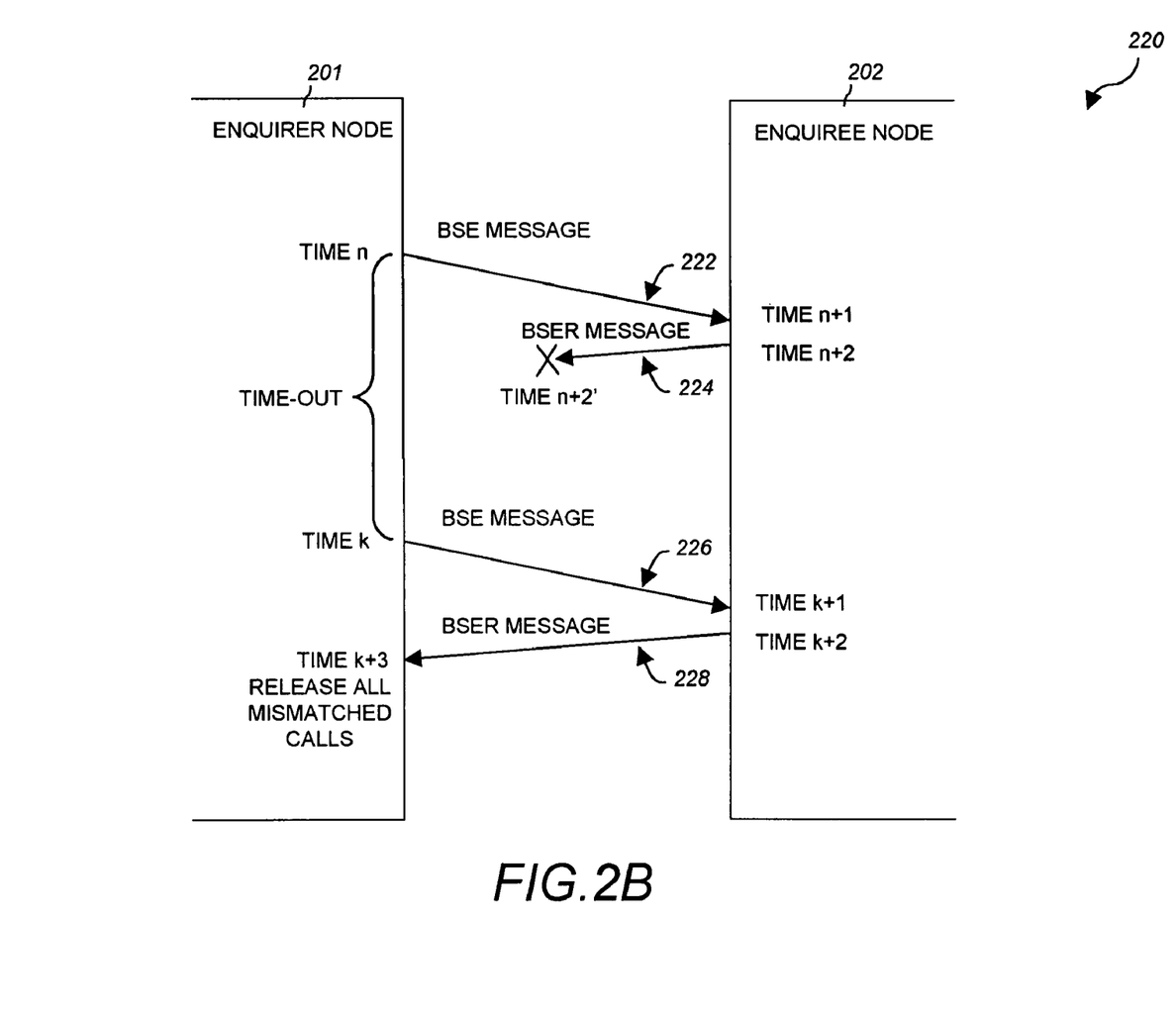
FIG. 2B shows a bulk status enquiry re-try due to a time-out.

FIG. 2B shows a bulk status enquiry re-try 220 due to a time-out. The bulk status enquiry re-try 220 involves an enquirer node 201 and an enquiree node 202.

At time n, the enquirer node 201 sends a BSE message to the enquiree node 202 via a path 222. The enquiree node 201 receives the BSE message at time n+1 and sends a BSER message at time n+2 via a path 224. However, the timer at the enquirer node 201 times out before the BSER message arrives at the enquirer node 201. The time-out occurs when the BSER message travels at point X at time n+2'. Since the enquirer node 201 does not receive a BSER message within the time-out period, it performs a re-try by re-sending the BSE message.

At time k, the enquirer node 201 sends a re-try BSE message to the enquiree node 202 via a path 226. The enquiree node 201 receives the BSE message at time k+1 and sends a BSER message at time k+2 via a path 228. The enquirer node 201 receives the BSER message at time k+3 within the time-out period as set by the timer of the enquirer node 201. The re-try results in a successful enquiry.

Figure 2C:
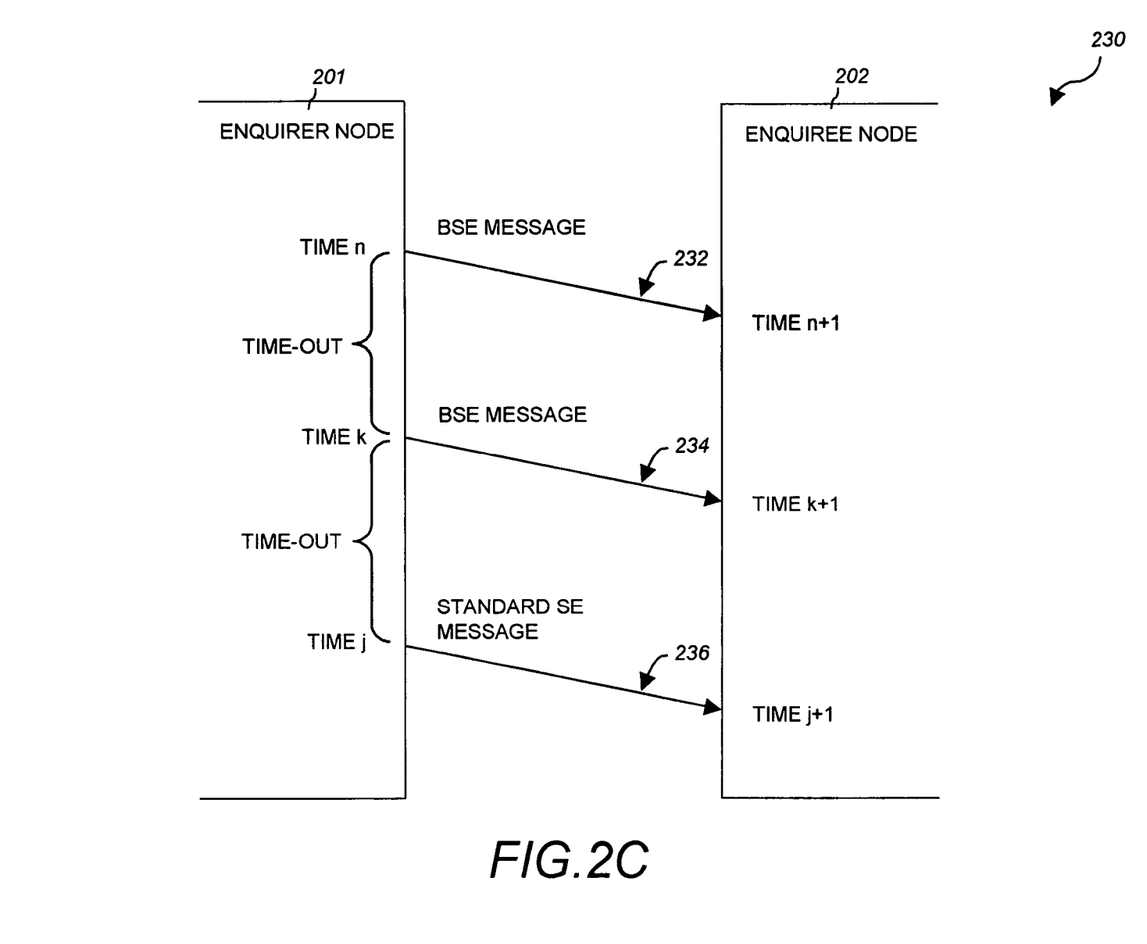
FIG. 2C shows a failed bulk status enquiry due to two time-outs.

FIG. 2C shows a failed bulk status enquiry 230 due to two time-outs. The failed bulk status enquiry 230 involves an enquirer node 201 and an enquiree node 202.

At time n, the enquirer node 201 sends a BSE message to the enquiree node 202 via a path 232. The enquiree node 201 receives the BSE message at time n+1. The enquiree node 201 may or may not respond to the BSE message. At time k, the timer times out and the enquirer node 201 has not received a BSER message. Therefore, the enquirer node 201 performs a re-try by resending the BSE message at time k via a path 234. Again, the enquiree node 202 may or may not respond to the BSE message.

At time j, the timer times out and the enquirer node 201 still has not received a BSER message from the enquiree node 202. The enquirer node 201 then sends a standard status enquiry (SE) via a path 236. The enquiree node 202 receives the standard SE message at time j+1. At this point, the procedure governing the standard SE protocol applies and the process proceeds according to the standard status enquiry procedure.

It is noted that in this example, the enquirer node 201 performs two bulk enquiries with one re-try before reverting back to the standard status enquiry procedure. Obviously, any predetermined number of times of unsuccessful re-tries can be used before using the standard status enquiry.

Figure 2D:
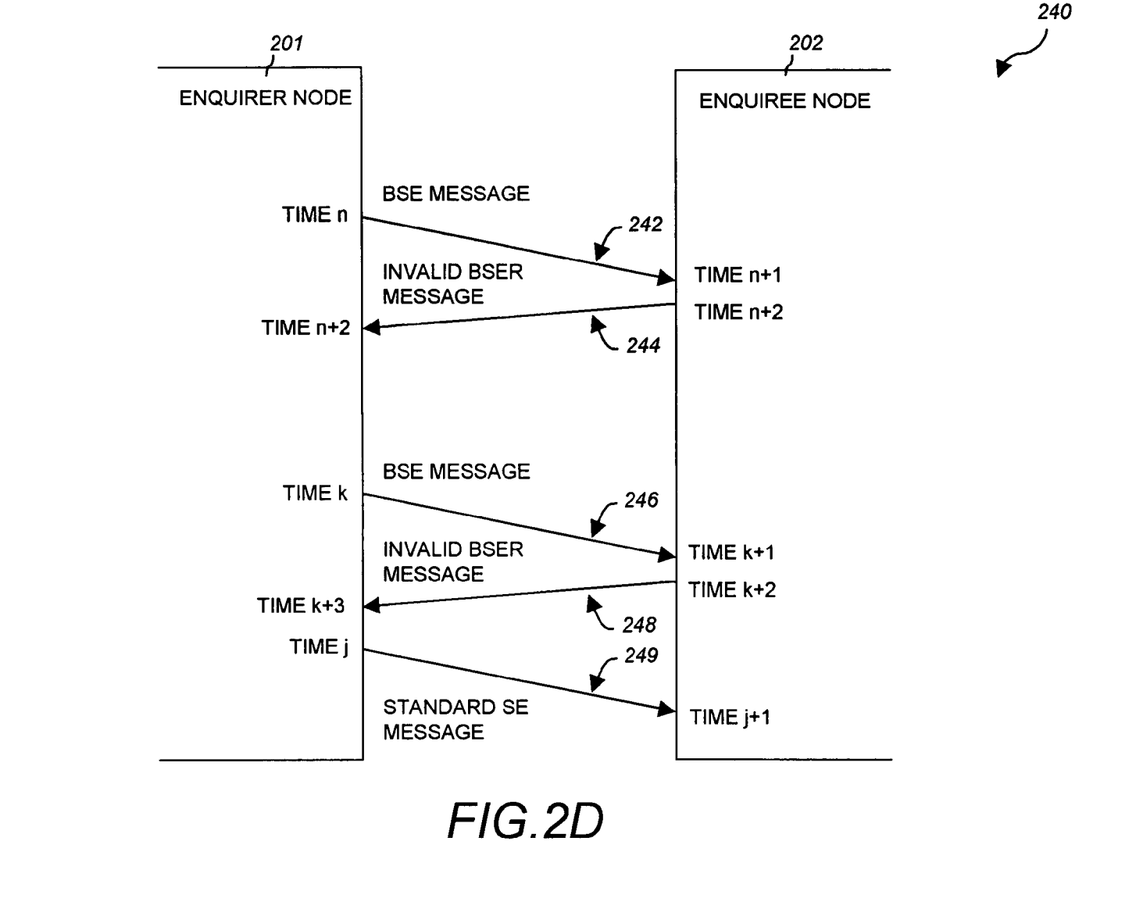
FIG. 2D shows a failed bulk status enquiry due to invalid bulk status enquiry response messages.

FIG. 2D shows a failed bulk status enquiry 240 due to invalid bulk status enquiry response messages. The bulk status enquiry 240 involves an enquirer node 201 and an enquiree node 202.

At time n, the enquirer node 201 sends a BSE message to the enquiree node 202 via a path 242. The enquiree node 202 receives the BSE message at time n+1 and sends a BSER message at time n+2 via a path 244. However, the BSER message is invalid. The enquirer node 201 receives the invalid BSER message at time n+3, within the time-out period. The enquirer node 201 checks the format of the BSER message and determines that the received BSER message is invalid.

At time k, the enquirer node 201 performs a re-try by re-sending the BSE message via a path 246. The enquiree node 202 receives the BSE message at time k+1 and sends a BSER message at time k+2 via a path 248. However, the BSER message is again invalid. The enquirer node 201 receives the invalid BSER message at time k+3, within the time-out period. The enquirer node 201 checks the format of the BSER message and determines that the received BSER message is invalid.

After two unsuccessful enquiries, the enquirer node reverts to the standard status enquiry procedure. At time j, the enquirer node 201 sends a standard status enquiry (SE) via a path 249. The enquiree node 202 receives the standard SE message at time j+1. At this point, the procedure governing the standard SE protocol applies and the process proceeds according to the standard status enquiry procedure.

It is noted that in this example, the enquirer node 201 performs two bulk enquiries with one re-try before reverting back to the standard status enquiry procedure. Obviously, any predetermined number of times of unsuccessful re-tries can be used before using the standard status enquiry.

Figure 2E:
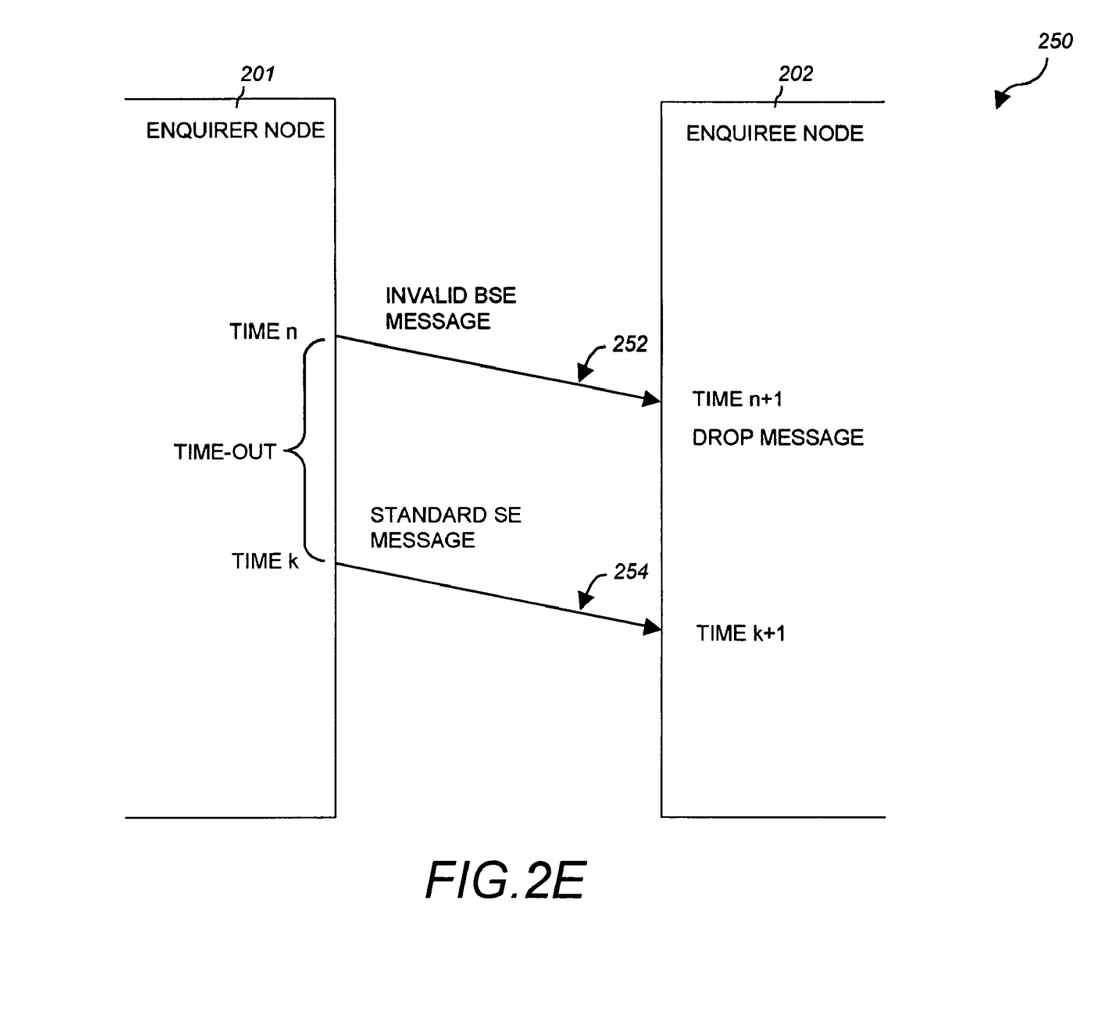
FIG. 2E shows a failed bulk status enquiry due to invalid bulk status enquiry message.

FIG. 2E shows a failed bulk status enquiry 250 due to invalid bulk status enquiry message. The bulk status enquiry 250 involves an enquirer node 201 and an enquiree node 202.

At time n, the enquirer node 201 sends a BSE message to the enquiree node 202 via a path 252. The enquiree node 202 receives the BSE message at time n+1. However, the received BSE message is invalid. The enquiree node 202 checks the format of the BSE message and determines that the received BSE message is invalid. The enquiree node 202 then drops the BSE message.

At time k, the timer times out, the enquirer node 201 sends a standard status enquiry message to the enquiree node 202 via a path 254. The enquiree node 202 receives the standard SE message at time k+1. At this point, the procedure governing the standard SE protocol applies and the process proceeds according to the standard status enquiry procedure.

The BSE message follows a BSE format and the BSER message follows a BSER format. To simplify encoding and decoding messages, it is preferable to have the same format for both types of messages.

Figure 3:
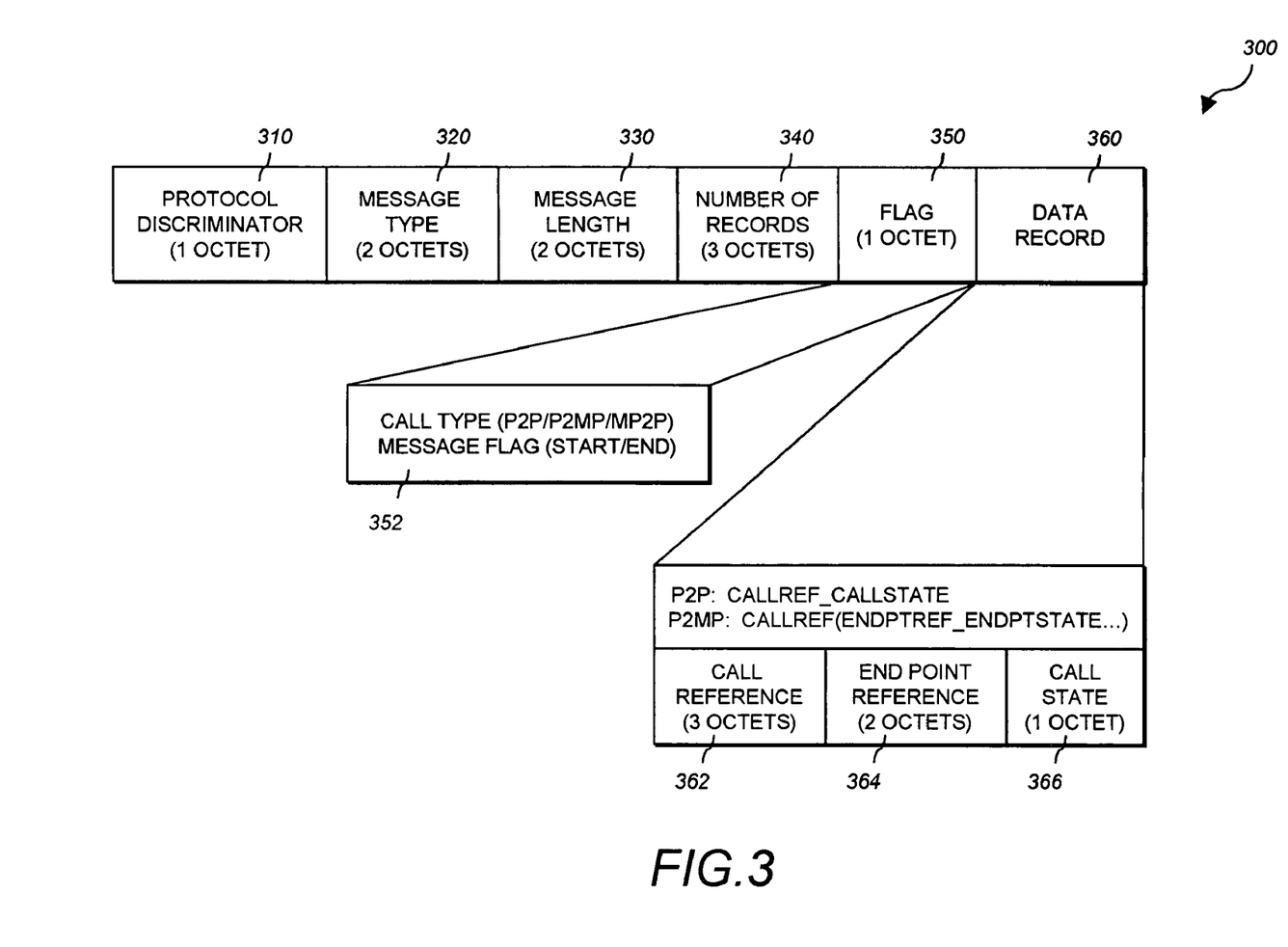
FIG. 3 shows a format of the bulk status enquiry and the bulk status enquiry response messages.

FIG. 3 shows a format 300 of the bulk status enquiry and the bulk status enquiry response messages. The format 300 includes a protocol discriminator field 310, a message type field 320, a message length field 330, a record number field 340, a flag field 350, and a data record field 360.

The protocol discriminator field 310 distinguishes messages among different call controls such as user-network interface (UNI), network-network interface (NNI), and other network layer protocol units which are coded to other ITU-T recommendations and other standards. The protocol discriminator field 310 is at the first part of a BSE or BSER message. In one embodiment, the protocol discriminator field 310 comprises one octet.

The message type field 320 indicates the type of the message, whether it is a BSE or a BSER message. The message type field 320 may also include flags or action indicator to indicate how the receiver should handle unrecognized messages. In one embodiment, the message type field 320 comprises two octets.

The message length field 330 indicates the length of the message. It may contain the count of the octets of the message contents. In one embodiment, the message length field 330 comprises two octets.

The record number field 340 indicates the number of records in the message. In one embodiment, a default number is used, e.g., 1000. The record number field 340 may be configurable and set at the time the message is sent. The default value may also be set by the system administrator or manager according to the specific network configuration and resource availability. In one embodiment, the record number field 340 comprises three octets.

The flag field 350 indicates the call type and the delimiter (e.g, start, end). The call type may be any call type supported by the network. For examples, the call type may be one of a point-to-point (P2P) call, a point-to-multipoint (P2MP) call, and a multipoint-to-point (MP2P) call. The message delimiter may be either start or end. The start and end flags allow re-synchronizing only those calls which may have been affected by a Q.SAAL reset. All the subsequent calls are untouched. In addition, the BSE procedure can also be started by a network administrator through a user interface, or can be automatically done using a script running periodically. In a standard status enquiry procedure, if a number of calls are coming in on a link and are reset, all of them are re-synchronized, resulting in wasteful processing time and degraded performance.

The data record field 360 contains the data part of the message. The data part may have a call reference and call state pair for a P2P call, or call reference having end point reference and end point state information for a P2MP call. The data record field 360 comprises a call reference field 362, an end point reference field 364, and a call state field 366. The call reference field 362 identifies the call to which the BSE or BSER message applies. The end point reference field 364 indicates the end point reference to which the BSE and BSER message applies. The call state field 366 indicates the state of the referenced call. In one embodiment, the call reference field 362, the end point reference field 364, and the call state field 366 comprise three octets, two octets, and one octet, respectively.

Figure 4A:
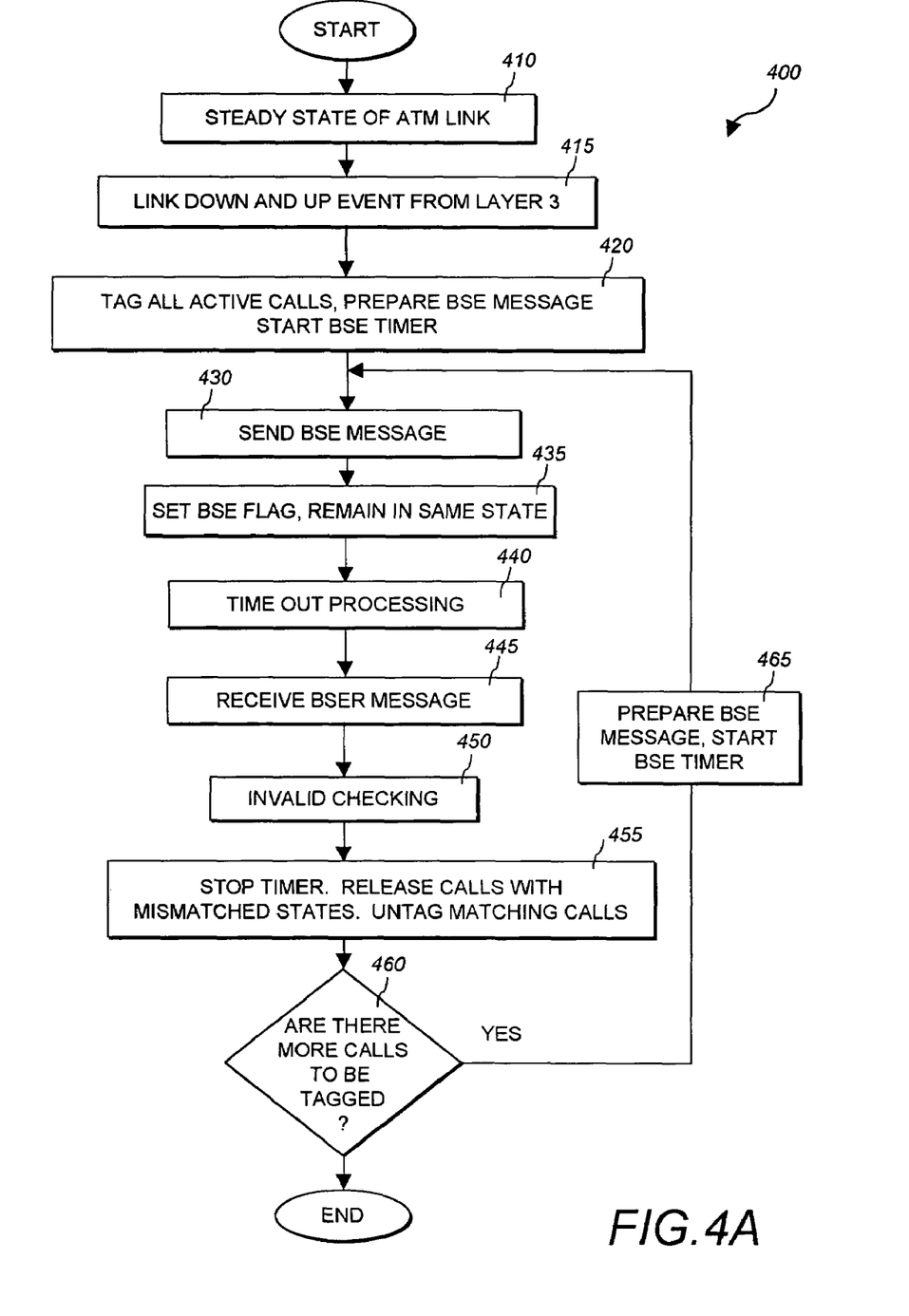
FIG. 4A shows a flowchart for a bulk status enquiry process.

FIG. 4A shows a flowchart for a bulk status enquiry process 400. The process 400 is used by the sender of the BSE message, or the enquirer node 201 as shown in FIGS. 2A-2E.

Upon START, the process 400 is in a steady state of the ATM link (Block 410). The process 400 links down and up event from layer 2 (Block 415) to prepare the bulk status enquiry process. The process 400 tags all calls that have not been enquired, prepares the BSE message, and starts the BSE timer (Block 420).

Then, the process 400 transmits the BSE message over the link to the enquireed node or the receiver (Block 430). The process 400 sets the BSE flags and remains in the same state (Block 435). The process 400 processes a time-out sequence (Block 440) which is described later in FIG. 4B.

Next, the process 400 receives the BSER message from the receiver or the enquiree node (Block 445). The process 400 performs an invalid message checking (Block 450) which is described later in FIG. 4C. Then, the process 400 stops the timer, releases calls with mismatched states based on the information contained in the BSER message, and removes the tags of the matching calls (Block 455).

Then, the process 400 determines if there are more calls to be tagged or inquired (Block 460). If there are more calls to be tagged, the process 400 prepares another BSE message and starts the timer (Block 465) and then returns back to Block 430 to transmit the BSE message. If all calls have been processed, the process 400 is terminated.

Figure 4B:
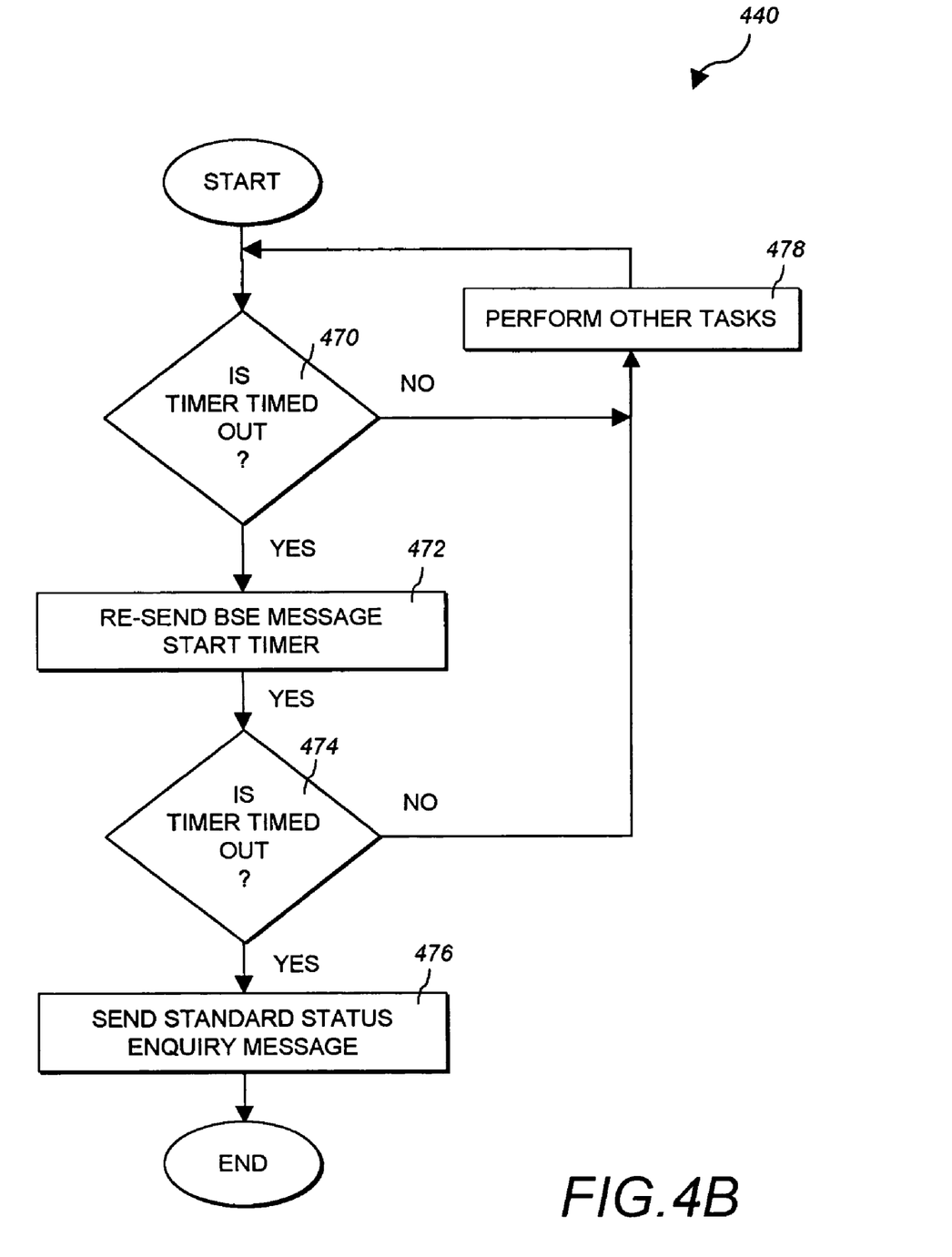
FIG. 4B shows a flowchart for a time-out process.

FIG. 4B shows a flowchart for a time-out process 440. The time-out process 400 performs a re-try if the timer times out.

Upon START, the process 440 determines if the timer times out based on a predetermined time-out period (Block 470). If not, the process 440 performs other tasks (Block 478) and returns back to block 470. If the timer has timed out, the process 440 re-sends the BSE message and starts the timer again (Block 472). Then the process 440 determines if the timer times out (Block 474). If not, the process 440 performs other tasks (Block 478) and returns to Block 470. If the timer times out again, the process 440 sends a standard status enquiry message (Block 476).

As noted earlier, although the flowchart shown in FIG. 4B allows one re-try, the number of re-tries can be any predetermined number according to the network management and/or system administrator.

Figure 4C:
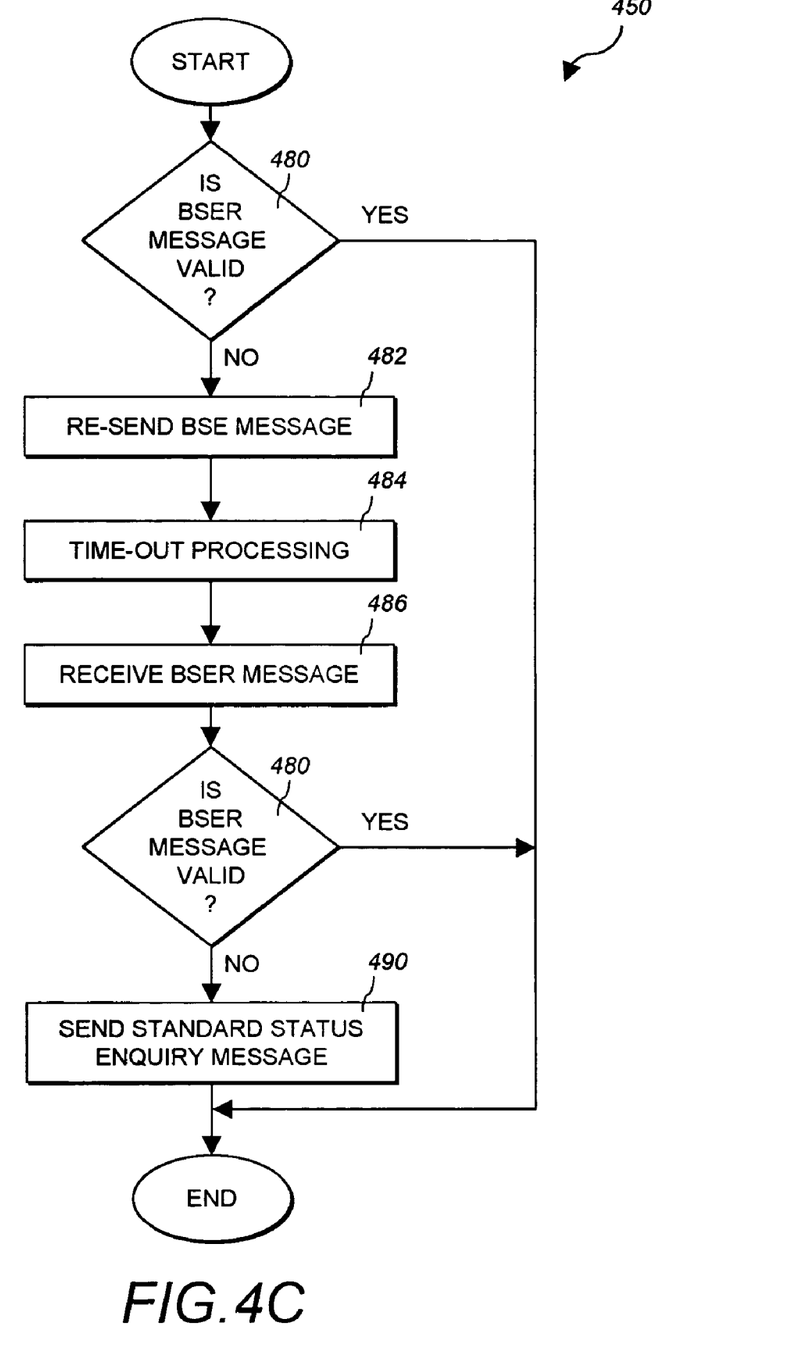
FIG. 4C shows a flowchart for an invalid message checking process.

FIG. 4C shows a flowchart for an invalid message checking process 450. The process 450 is used by the enquirer node or the sender of the BSE message.

Upon START, the process 450 determines if the received BSER message is valid. If it is valid, the process 450 is terminated. If it is not valid, the process 450 re-sends the BSE message (Block 482). Then the process 450 performs a time-out process (Block 484) in a similar manner as shown in FIG. 4B.

Next, the process 450 receives the BSER message from the enquiree node or receiver (Block 486). The process 450 determines if the received BSER message is valid (Block 488). If it is valid, the process 450 is terminated. Otherwise, the process 450 sends a standard status enquiry message and follow the standard status enquiry procedure (Block 490) and is then terminated.

Figure 5:
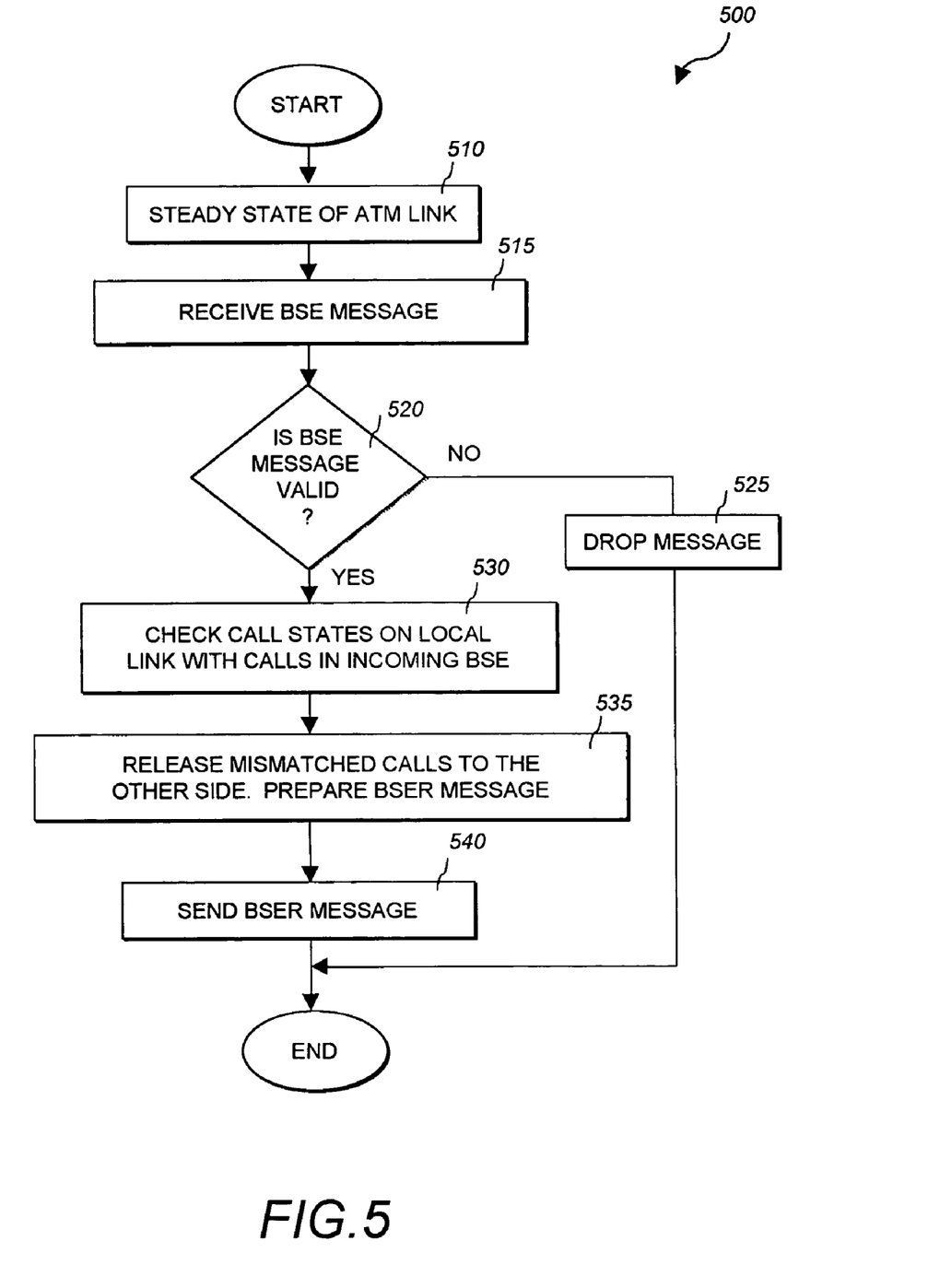
FIG. 5 shows a flowchart for a bulk status enquiry response process.

FIG. 5 shows a flowchart for a bulk status enquiry response process 500. The process 500 is used by the enquiree node or the receiver in response to the BSE message.

Upon START, the process 500 is in the steady state of the ATM link (Block 510). Then the process 500 receives a BSE message sent by an enquirer node or the sender (Block 515). The process 500 determines if the received BSE message is valid (Block 520). If the message is not valid, the process 500 drops the message (Block 525) and is terminated. If the message is valid, the process 500 checks the call states on the local link with the calls in the incoming BSE message (Block 530). Then, based on the results of the state checking, the process 500 releases the mismatched calls to the other side and prepares a BSER message (Block 535). Next, the process 500 transmits the BSER message to the enquirer node or the sender (Block 540) and is then terminated.

Enhanced BSE Procedures:

The BSE procedure described above may be enhanced to improved performance. Some examples of these enhancements include the following:

1) The BSE procedure can be primarily used to re-synchronize call states of calls only. For example, while sending the BSER message, the list of call references that are not active can be sent. This will minimize the message size and processing time.

2) The number of BSE messages to be sent can be reduced by half. In a normal BSE procedure, the BSE messages are sent for all the calls on all the ports because each call has two states, one associated with the ingress and one associated with the egress interface. This can be reduced by half by sending only one entry per call. A criterion is to impose that only the originating side of the call needs to be re-synchronized.

3) The number of enquiring nodes can be reduced in half. For a given call, both the nodes may enquire the state. This can be reduced by half by allowing the node with a higher node ID (e.g., in the PNNI case) or on the network side (for the UNI/IISP case) to initiate the BSE procedure. All the calls that are not enquired are removed from the peer.

A technique has been described for status enquiry between sending and receiving network nodes. The status enquiry is based on an exchange of a bulk status enquiry message and a bulk status enquiry response message which correspond to a plurality of calls in the network nodes. By processing the status enquiry for a large number of messages, the technique is fast and preserves resources such as host processing and SAR bandwidths.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for status enquiry between sending and receiving nodes in a network, the method comprising:
   sending a bulk status enquiry message to the receiving node to inquire status of a plurality of calls between the sending and receiving nodes, the bulk status enquiry message conforming to a bulk status enquiry format.

2. The method of claim 1 further comprising:
   receiving a bulk status enquiry response message from the receiving node, the bulk status enquiry response message conforming to a bulk status enquiry response format.

3. The method of claim 1 wherein sending the bulk status enquiry message composes:
   tagging the plurality of calls for bulk status enquiry.

4. The method of claim 3 wherein sending the bulk status enquiry message further comprises:
   starting a timer;
   transmitting the bulk status enquiry message; and
   processing a time-out sequence.

5. The method of claim 4 further comprising:
   checking the bulk status enquiry response message;
   stopping the timer;
   releasing calls having mismatched states; and
   untagging matching calls.

6. The method of claim 5 wherein checking the bulk status enquiry response message comprises:
   re-sending the bulk status enquiry message for a predetermined number of times if the bulk status enquiry response message is invalid; and
   sending a standard status enquiry if the bulk status enquiry response message is invalid for the predetermined number of times.

7. The method of claim 6 wherein processing the time-out sequence comprises:
   re-sending the bulk status enquiry message for a predetermined number of times if the timer times out based on a predetermined time-out period, the timer being re-started each time the bulk status enquiry message is re-sent; and
   sending the standard status enquiry after the timer times out for the predetermined number of times.

8. The method of claim 5 wherein checking the bulk status enquiry response message further comprises:
   processing a time-out sequence.

9. The method of claim 4 wherein processing the time-out sequence comprises:
   re-sending the bulk status enquiry message for a predetermined number of times if the timer times out based on a predetermined time-out period, the timer being re-started each time the bulk status enquiry message is re-sent; and
   sending the standard status enquiry after the timer times out for the predetermined number of times.

10. The method of claim 1 wherein the bulk status enquiry format and the bulk status enquiry response format are identical.

11. The method of claim 10 wherein the bulk status enquiry format comprises a record number field, a flag field, and a record field, the record number field indicating a number of records in the record field.

12. The method of claim 11 wherein the flag field comprises a call type and a message flag, the call type being one of a point-to-point type, a point-to-multipoint type, and a multipoint-to-point type, the message flag being one of a start flag and an end flag.

13. The method of claim 1 wherein the network is an asynchronous transfer mode (ATM) network.

14. A method for status enquiry between sending and receiving nodes in a network, the method comprising:
   sending a bulk status enquiry response message in response to a bulk status enquiry message from the sending node inquiring status of a plurality of calls between the sending and receiving nodes, the bulk status enquiry message conforming to a bulk status enquiry format, the bulk status enquiry response message conforming to a bulk status enquiry response format.

15. The method of claim 14 further comprising:
   dropping the bulk status enquiry message if the bulk status enquiry message is invalid.

16. The method of claim 15 further comprising:
   checking call states on a local link at the receiving node with the plurality of calls inquired by the bulk status enquiry message; and
   releasing mismatched calls.

17. The method of claim 16 further comprising:
   including a list of call references that are not active in the BSER message.

18. The method of claim 14 wherein the bulk status enquiry format and the bulk status enquiry response format are identical.

19. The method of claim 18 wherein the bulk status enquiry format comprises a record number field, a flag field, and a record field, the record number field indicating a number of records in the record field.

20. The method of claim 19 wherein the flag field comprises a call type and a message flag, the call type being one of a point-to-point type, a point-to-multipoint type, and a multipoint-to-point type, the message flag being one of a start flag and an end flag.

21. The method of claim 14 wherein the network is an asynchronous transfer mode (ATM) network.

22. A computer program product comprising:
storage device having computer program code embodied therein for status enquiry between sending and receiving nodes in a network, the computer program product having:
computer readable program code for sending a bulk status enquiry message to the receiving node to inquire status of a plurality of calls between the sending and receiving nodes, the bulk status enquiry message conforming to a bulk status enquiry format.

23. The computer program product of claim 22 further comprising:
computer readable program code for receiving a bulk status enquiry response message from the receiving node, the bulk status enquiry response message conforming to a bulk status enquiry response format.

24. The computer program product of claim 22 wherein the computer readable program code sending the bulk status enquiry message comprises:
computer readable program code for tagging the plurality of calls for bulk status enquiry.

25. The computer program product of claim 24 wherein the computer readable program code sending the bulk status enquiry message further comprises:
computer readable program code for starting a timer;
computer readable program code for transmitting the bulk status enquiry message; and
computer readable program code for processing a time-out sequence.

26. The computer program product of claim 25 further comprising:
computer readable program code for checking the bulk status enquiry response message;
computer readable program code for stopping the timer;
computer readable program code for releasing calls having mismatched states; and
computer readable program code for untagging matching calls.

27. The computer program product of claim 26 wherein the computer readable program code for checking the bulk status enquiry response message comprises:
computer readable program code for re-sending the bulk status enquiry message for a predetermined number of times if the bulk status enquiry response message is invalid; and
computer readable program code for sending a standard status enquiry if the bulk status enquiry response message is invalid for the predetermined number of times.

28. The computer program product of claim 27 wherein the computer readable program code for processing the time-out sequence comprises:
computer readable program code for re-sending, the bulk status enquiry message for a predetermined number of times if the timer times out based on a predetermined time-out period, the timer being re-started each time the bulk status enquiry message is re-sent; and
computer readable program code for sending the standard status enquiry after the timer times out for the predetermined number of times.

29. The computer program product of claim 26 wherein the computer readable program code for checking the bulk status enquiry response message further comprises:
computer readable program code for processing a time-out sequence.

30. The computer program product of claim 25 wherein the computer readable program code for processing the time-out sequence comprises:
computer readable program code for re-sending the bulk status enquiry message for a predetermined number of times if the timer times out based on a predetermined time-out period, the timer being re-started each time the bulk status enquiry message is re-sent; and
computer readable program code for sending the standard status enquiry after the timer times out for the predetermined number of times.

31. The computer program product of claim 22 wherein the bulk status enquiry format and the bulk status enquiry response format are identical.

32. The computer program product of claim 31 wherein the bulk status enquiry format comprises a record number field, a flag field, and a record field, the record number field indicating a number of records in the record field.

33. The computer program product of claim 32 wherein the flag field comprises a call type and a message flag, the call type being one of a point-to-point type, a point-to-multipoint type, and a multipoint-to-point type, the message flag being one of a start flag and an end flag.

34. The computer program product of claim 33 wherein the network is an asynchronous transfer mode (ATM) network.

35. A computer program product comprising:
a storage device having computer program code embodied therein for status enquiry between sending and receiving network nodes in a network, the computer program product having:
computer readable program code for sending a bulk status enquiry response message in response to a bulk status enquiry message from the sending node inquiring status of a plurality of calls between the sending and receiving nodes, the bulk status enquiry message conforming to a bulk status enquiry format, the bulk status enquiry response message conforming to a bulk status enquiry response format.

36. The computer program product of claim 35 further comprising:
computer readable program code for dropping the bulk status enquiry message if the bulk status enquiry message is invalid.

37. The computer program product of claim 36 further comprising:
computer readable program code for checking call states on a local link at the receiving node with the plurality of calls inquired by the bulk status enquiry message; and
computer readable program code for releasing mismatched calls.

38. The computer program product of claim 37 further comprising:
computer readable program code for including a list of call references that are not active in the BSER message.

39. The computer program product of claim 35 wherein the bulk status enquiry format and the bulk status enquiry response format are identical.

40. The computer program product of claim 39 wherein the bulk status enquiry format comprises a record number field, a flag field, and a record field, the record number field indicating a number of records in the record field.

41. The computer program product of claim 40 wherein the flag field comprises a call type and a message flag, the call type being one of a point-to-point type, a point-to-multipoint type, and a multipoint-to-point type, the message flag being one of a start flag and an end flag.

42. The computer program product of claim 35 wherein the network is an asynchronous transfer mode (ATM) network.

43. A system comprising:
  a processor coupled to a network;
  a memory coupled to the processor, the memory containing program code for status enquiry between sending and receiving nodes, the program code when executed causing the processor to:
  send a bulk status enquiry message to the receiving node to inquire status of a plurality of calls between the sending and receiving nodes, the bulk status enquiry message conforming to a bulk status enquiry format.

44. The system of claim 43 wherein the program code when executed further causing the processor to:
  receive a bulk status enquiry response message from the receiving node, the bulk status enquiry response message conforming to a bulk status enquiry response format.

45. The system of claim 43 wherein the program code causing the processor to send the bulk status enquiry message causes the processor to tag the plurality of calls for bulk status enquiry.

46. The system of claim 45 wherein the program code causing the processor to send the bulk status enquiry message further causes the processor:
  to start a timer;
  to transmit the bulk status enquiry message; and
  to process a time-out sequence.

47. The system of claim 46 wherein the program code when executed further causing the processor:
  to check the bulk status enquiry response message;
  to stop the timer;
  to release calls having mismatched states; and
  to untag matching calls.

48. The system of claim 47 wherein the program code causing the processor to check the bulk status enquiry response message causes the processor:
  to re-send the bulk status enquiry message for a predetermined number of times if the bulk status enquiry response message is invalid; and
  to send a standard status enquiry if the bulk status enquiry response message is invalid for the predetermined number of times.

49. The system of claim 43 wherein the program code causing the processor to process the time-out sequence causes the processor:
  to re-send the bulk status enquiry message for a predetermined number of times if the timer times out based on a predetermined time-out period, the timer being re-started each time the bulk status enquiry message is re-sent; and
  to send the standard status enquiry after the timer times out for the predetermined number of times.

50. The system of claim 47 wherein the program code causing the processor to check the bulk status enquiry response message causes the processor to process a time-out sequence.

51. The system of claim 46 wherein the program code causing the processor to process the time-out sequence causes the processor:
  to re-send the bulk status enquiry message for a predetermined number of times if the timer times out based on a predetermined time-out period, the timer being re-started each time the bulk status enquiry message is re-sent; and
  to send the standard status enquiry after the timer times out for the predetermined number of times.

52. The system of claim 43 wherein the bulk status enquiry format and the bulk status enquiry response format are identical.

53. The system of claim 52 wherein the bulk status enquiry format comprises a record number field, a flag field, and a record field, the record number field indicating a number of records in the record field.

54. The system of claim 53 wherein the flag field comprises a call type and a message flag, the call type being one of a point-to-point type, a point-to-multipoint type, and a multipoint-to-point type, the message flag being one of a start flag and an end flag.

55. The system of claim 43 wherein the network is an asynchronous transfer mode (ATM) network.

56. A system comprising:
  a processor;
  a network interface coupled to the processor and a network;
  a memory coupled to the processor, the memory containing program code for status enquiry between sending and receiving nodes, the program code when executed causing the processor to:
  send a bulk status enquiry response message in response to a bulk status enquiry message from the sending node inquiring status of a plurality of calls between the sending and receiving nodes, the bulk status enquiry message conforming to a bulk status enquiry format, the bulk status enquiry response message conforming to a bulk status enquiry response format.

57. The system of claim 56 wherein the program code when executed further causing the processor to drop the bulk status enquiry message if the bulk status enquiry message is invalid.

58. The system of claim 57 wherein the program code when executed further causing the processor:
  to check call states on a local link at the receiving node with the plurality of calls inquired by the bulk status enquiry message; and
  to release mismatched calls.

59. The system of claim 58 wherein the program code when executed further causing the processor:
  to include a list of call references that are not active in the BSER message.

60. The system of claim 56 wherein the bulk status enquiry format and the bulk status enquiry response format are identical.

61. The system of claim 60 wherein the bulk status enquiry format comprises a record number field, a flag field, and a record field, the record number field indicating a number of records in the record field.

62. The system of claim 61 wherein the flag field comprises a call type and a message flag, the call type being one of a point-to-point type, a point-to-multipoint type, and a multipoint-to-point type, the message flag being one of a start flag and an end flag.

63. The system of claim 56 wherein the network is an asynchronous transfer mode (ATM) network.

* * * * *